United States Patent [19]

Kodaira

[11] 4,264,962
[45] Apr. 28, 1981

[54] SMALL-SIZED ELECTRONIC CALCULATOR

[75] Inventor: Hitoshi Kodaira, Higashikurume, Japan

[73] Assignee: Beam Engineering Kabushiki Kaisha, Tokyo, Japan

[21] Appl. No.: 4,604

[22] Filed: Jan. 18, 1979

[30] Foreign Application Priority Data

| Feb. 7, 1978 | [JP] | Japan | 53-13395[U] |
| Feb. 7, 1978 | [JP] | Japan | 53-13396[U] |
| Feb. 20, 1978 | [JP] | Japan | 53-19712[U] |
| May 29, 1978 | [JP] | Japan | 53-71663[U] |
| Jul. 27, 1978 | [JP] | Japan | 53-103387[U] |

[51] Int. Cl.³ .............................................. G06F 15/02
[52] U.S. Cl. ..................................... 364/707; 136/291; 364/705; 364/708
[58] Field of Search ......................... 364/705, 707, 708; 136/89 TF, 89 AC; 340/636

[56] References Cited

U.S. PATENT DOCUMENTS

| 3,940,679 | 2/1976 | Brandwein et al. | 340/636 X |
| 4,017,725 | 4/1977 | Roen | 364/705 |
| 4,096,577 | 6/1978 | Ferber et al. | 364/708 X |
| 4,120,036 | 10/1978 | Maeda et al. | 364/705 |
| 4,152,535 | 5/1979 | Deminet et al. | 136/89 TF |

Primary Examiner—Jerry Smith
Attorney, Agent, or Firm—Robert E. Burns; Emmanuel J. Lobato; Bruce L. Adams

[57] ABSTRACT

A small-sized electronic calculator, which comprises a power source in the form of a solar battery having a film of polycrystalline photoconductive material, such as selenium. The solar battery is connected for angular movement to the calculator body by suitable connection means, such as a hinge and a foldable metal spring. The calculator body includes a display section of liquid crystal elements. The solar battery may include an overvoltage preventing circuit and a reset switch. The output of the solar battery may be converted to a digital value to indicate the luminescent by the display section.

16 Claims, 16 Drawing Figures

SMALL-SIZED ELECTRONIC CALCULATOR

BACKGROUND OF THE INVENTION

The present invention relates to a small-sized electronic calculator.

Table-top electronic calculators and portable electronic calculators are generally well known. Some of them are connected to the household 110-volts AC power line, while many of them use suitable primary batteries, such as silver oxide, lithium or manganese cells. Battery-powered calculators are advantageous in that they can be used without any commercial electric power line, and they are ready for use at any desired place. Particularly, portable electronic calculators have which have the size of a usual credit card and use a thin silver oxide battery are well known. The life of such a conventional battery is relatively short because the user often forgets turning off the battery when the operation of the calculator is interrupted. It is troublesome for the user to exchange a used small battery with a new one. Further, since exhaustion of silver natural resources must be predicted, there is a strong demand for electronic calculators having no primary battery.

On the other hand, solar batteries are also well known. Single crystal silicon photocells have widely been developed and used. Single crystal silicon is most frequently used as the photovoltaic layer of solar batteries, because it is popular in the semi-conductor art and has a high efficiency of conversion of photo energy into electric energy per unit area.

Single crystal silicon is advantageous in the conversion efficiency as described above. However, a single crystal silicon chip is expensive, comparatively small in surface area, and readily broken down due to low mechanical (bending and impact) strength. To use a single crystal silicon photocell as the power source of an electronic calculator, a plurality of such photocells should be successively connected in series to one another to increase the output voltage. Electrical connection of the single crystal silicon chips raises the cost and the danger of fault or disconnection.

The demand for electronic calculators requiring neither exchange of a battery nor the charging of the battery is very strong. It is apparent that electronic calculators will be widely used in developing countries if those requiring no primary battery are made available. Strongly desired is an electronic calculator having as its electrical power source a solar battery which is inexpensive, easily manufactured and assembled, and reliable when compared with that having the single crystal silicon solar battery.

SUMMARY OF THE INVENTION

An object of the present invention is to solve the above-mentioned problems associated with the prior electronic calculators and to provide a novel small-sized electronic calculator which uses no primary battery, needs neither exchange nor the charging of the battery, and has a long life.

In accordance with the present invention, there is provided a small-sized electronic calculator comprising: a calculator body including liquid crystal display means, and an electric power source comprised of a solar battery which has a film of photoconductive material as its photovoltaic layer. The solar battery is composed of a cell selected from a group of the first cell, the second cell and the third cell. The first cell includes an amorphous silicon film deposited on an iron plate. The second cell includes a polycrystalline selenium film deposited on an aluminum plate. The third cell includes a polycrystalline gallium arsenide film deposited on a nickel plate.

BRIEF DESCRIPTION OF THE DRAWING

The present invention will be described with reference to the accompanying drawings, in which.

DESCRIPTION OF THE PREFERRED EMBODIMENTS

In the prior art, solar batteries of single crystal silicon are generally used in the form of a chip of less than one millimeter (mm) in thickness in order to reduce the cost and to improve the performance. Such a chip is liable to be broken down. Further, a plurality of single crystal silicon cells must be successively connected in series to one another to obtain an output voltage sufficient for the operation of a calculator. However, series connection causes an increase of the cost and the lowering of reliability.

According to the present invention, a solar battery has a film of polycrystalline photoconductive material as its photovoltaic layer. The preferred photoconductive materials are selenium, silicon and gallium arsenide. In the following description, polycrystalline selenium is selected as a typical example. Selenium is not only free of the abovementioned shortcomings of single crystal silicon, but has desirable characteristics for the photovoltaic layer of a solar battery for use in an electronic calculator. Only one disadvantage of selenium is the low conversion efficiency, which requires a larger surface area than that in silicon.

Figure 1:
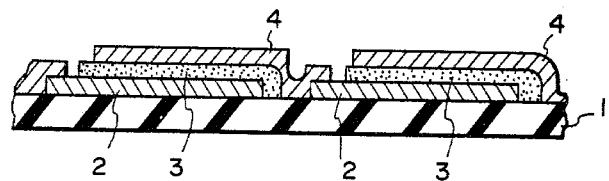
FIG. 1 is a section illustrating an example of a solar battery suitable for use in an electronic calculator according to the present invention.

In FIG. 1, an example of the solar battery suitable for use in the present invention is shown in cross section. The solar battery shown is obtained by vapor deposition on an insulating substrate 1 using a suitable mask to provide an aluminium or bismuth layer 2 having a thickness of about 10 μm. The aluminium or bismuth layer 2 serves as one electrode and to form the series connection. Selenium is vapor deposited on the layer 2 to form a selenium film 3 having a thickness of about 50 μm and then heat-treated to polycrystallize the selenium film 3. A cadmium layer 4 is then sputtered on the selenium film 3 to form a p-n junction therebetween. The cadmium layer 4 is as thin as about 0.3 μm so that incident light penetrates the cadmium layer 4 and reaches an interface between the layers 3 and 4. The cadmium layer 4 serves as the other electrode. In addition, a transparent conductive paint may optionally be sprayed on the cadmium layer 4 to enhance the electrical conduction. Cadmium may be sprayed in a predetermined pattern to form connection terminals and leads. Further, an anti-reflection coating may be applied. In FIG. 1, the transparent conductive paint layer and other additional layers are not shown.

As is apparent from FIG. 1, the cadmium layer 4 is applied on the selenium layer 3 and laterally extended to reach one edge of the adjacent aluminium electrode 2. In other words, the cadmium layer 4 is applied so that it forms a p-n junction with the selenium film 3 to constitute a photocell and also an electrical connection between adjacent photocells. These advantages are attained by using selenium, but not by using single crystal silicon, and ensure that a solar battery having a comparatively large surface area is easily produced at a low cost.

The materials for the insulating substrate 1 include a glass cloth impregnated with polyester, an anodized aluminium plate, a polycarbonate plate, a glass plate and the like. In each case, the substrate 1 should be flexible and as thin as about 0.5 mm.

The aluminium or bismuth electrode 2, the photoelectric selenium film 3 and the cadmium layer 4 and other layers may be prepared by vapor deposition or sputtering so that the resulting structure is very thin and lightweight and resistant to bending and impact actions, which are favorable from a point of view of the power source of a small-sized electronic calculator.

In the present invention, the solar battery is produced by the use of amorphous silicon and polycrystalline selenium and gallium arsenide. In case of amorphous silicon, a silicon film is deposited on an iron plate by resoluting silicon using glow-discharging under a low pressure of $10^{-2}$ mm/cm$^2$, and a p-n junction is provided by vapor-deposition of platinium on the silicon film. In case of gallium arsenide film is vapor-deposited on a nickel plate and then polycrystallized by heat treatment, and a germanium film is further deposited by sputtering.

Since the photoelectromotive force, the output current and the efficiency, etc. have different values in accordance with the employed substances, the substances are selected in consideration of easiness of the production treatment.

For instance, in case of a solar battery of amorphous silicon film, the photoelectromotive force when open-circuited, the output current when shortcircuited, and the efficiency are, respectively, 0.8 to 0.6 volts, 12 milliamperes/cm$^2$ and 2.4 to 4%. In case of a solar battery of polycrystallized gallium arsenide film, their values are 0.7 volts, 25 milliamperes/cm$^2$ and 14%. Moreover, in case of a solar battery of polycrystallized selenium film, their values are 0.4 volts, 0.3 milliamperes/cm$^2$ and 1.2%, respectively. Accordingly, the solar battery of polycrystallized selenium film has not so high performance in respect of all the considered points. However, since selenium has a low melting point, the solar battery of polycrystallized selenium film can be readily produced at a low cost, while the photoelectromotive force per unit area is a very low value equal about one tenth that of single crystal silicon.

However, selenium has a spectral sensitivity curve similar to the visual sensitivity curve of human eyes. Therefore, the photoelectromotive force of selenium is substantially equal to that of silicon when their photocells are used in offices or houses, particularly under artificial illumination such as fluorescent lamps. In addition, the advanced calculator has a liquid crystal display and an LSI calculating section so that the required electric power is very small, for example, about 60 μW ($60 \times 10^{-6}$ watts). This minimized power consumption permits the calculator to be fully operated by means of a selenium solar battery which is low in efficiency and readily formed into a series connection.

In order to use a solar battery as the power source of a small-sized electronic calculator, the solar battery may be formed into a body of the calculator. The surface area of a photovoltaic layer is inevitably small in this case, limiting allowable conditions under which the calculator is usable or operable. In practice, it is advantageous to separately arrange the calculator body and the solar battery so that the solar battery supplies power to the calculator body in response to the incident light only when the calculator is in use. However, when the size of the calculator is not so strictly limited as in the case of the table-top type or the like, the solar battery may be associated with the calculator body. Such a solar battery-mounted calculator is easily fabricated because the wirings between the calculator body and the solar battery can be formed on a common insulating substrate.

According to the invention, the solar battery may be arranged with reference to the calculator body in the following three ways.

(1) The calculator body and the power source of a solar battery are separate from and connected to each other by suitable connection means such as a hinge and a spring.

(2) The calculator body and the power source of a solar battery are separate from each other, arranged on either side of a support member foldable along its center line and electrically connected with each other.

(3) The solar battery is formed into the calculator body.

These arrangements are described in detail with reference to FIGS. 2 to 4.

Figure 2A:
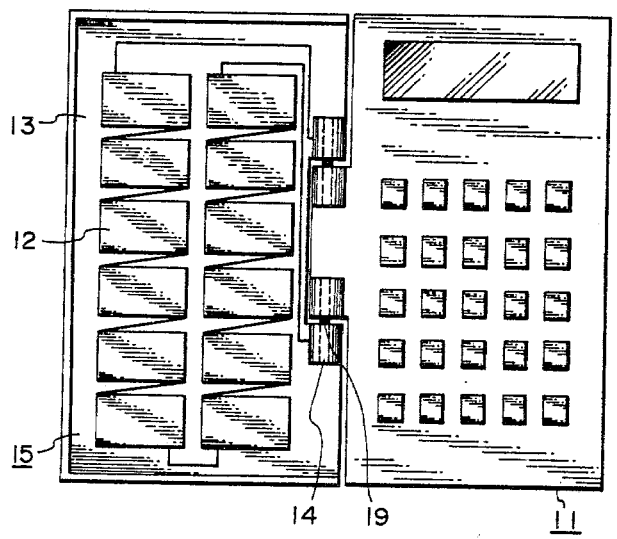
FIG. 2A is a plan view of an embodiment of the present invention when it is opened.
Figure 2B:
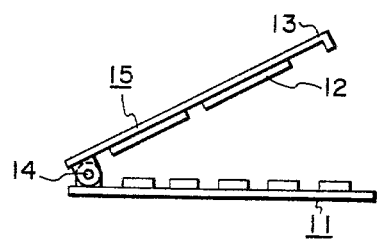
FIG. 2B is a cross-section of the calculator shown in FIG. 2A when it is half closed.
Figure 3:
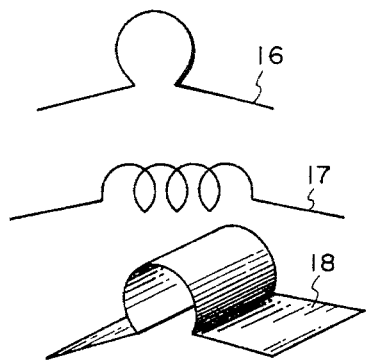
FIG. 3 shows some examples of connecting means employed in this invention.

FIGS. 2A and 2B are a plan view and a cross sectional view showing an embodiment of the calculator of the present invention, respectively. A body 11 of the calculator is independent of a power source unit 15 of a solar battery 12 formed on a substrate 13. They are mechanically connected to each other by metal shafts 14 and electrically connected to each other by metal springs 19 wound on the metal shafts 14.

As is apparent from FIG. 2B, the metal spring shaft 14 and the metal spring 19 allow the calculator body 11 and the power unit 15 to be opened from or closed against each other. In use, the power unit 15 is turned relative to the body 11 by a suitable angle. The unit 15 is positioned so as to expose the solar battery 12 to light, and the battery 12 receives a sufficient quantity of light to supply a power necessary to operate the calculator body 11. On the contrary, when the calculator is not used, the power unit 15 is turned at the shaft 14 in close engagement with the body 11. In this condition, the solar battery 12 receives no light and ceases to supply the power to the calculator body 11. Since the substrate 13 for the solar battery 12 also serves as a cover of the calculator, this calculator is compact and handy to carry the same when it is closed.

The calculator body 11 and the power unit 15 may be positioned at a variable angle about the axis of the connection means. Any suitable hinge may be used as the connection means. Elastic metal springs 16, 17 and 18 shown in FIG. 3 may also be used as the connection means or a part of connection means. Such a metal spring not only mechanically but also electrically connects between the body 11 and the power source 15. Since the metal spring is highly durable for rotation about the axis of the connection means, the electrical connection between the calculator body 11 and the power source 15 is stably maintained for a long period of time after repetition of the opening and closing operations of the power unit 15.

Figure 4A:
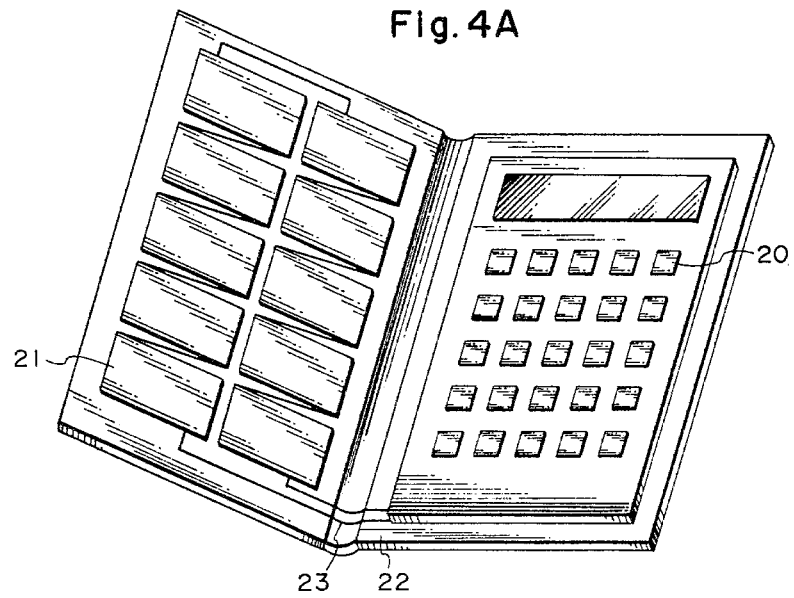
FIG. 4A is a perspective view of another embodiment of the present invention when it is opened.
Figure 4B:
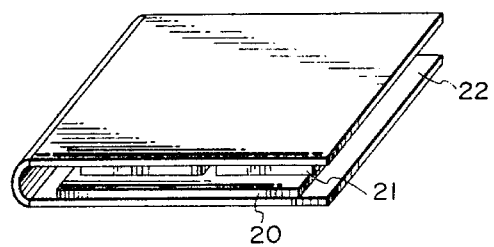
FIG. 4B is a perspective view of the calculator shown in FIG. 4A when it is closed.

FIGS. 4A and 4B show an embodiment, in which a calculator body 20 and a power source 21 of solar battery are arranged on one side of a support member 22 foldable along its center line and electrically connected to each other by leads 23. In FIG. 4A, the support member 22 is opened so that the solar battery 21 receives light, while in FIG. 4B, the member 22 is folded so that the body 20 faces the power source 21. With the support member 22 opened as shown in FIG. 4A, light enters the solar battery 21 which supplies enough power to operate the calculator body 20. With the member 22 closed as shown in FIG. 4B, the solar battery 21 receives no light, and the folded structure is compact and handy to carry as in the case of FIG. 2.

The support member 22 may be made of any suitable material. For example, artificial and natural leather and various plastics such as vinyl chloride and nylon may be used. Alternatively, two plates made of rigid material such as metal may be connected by a central elongated foldable member made of soft material such as leather.

The calculator body and the solar battery may be fixedly secured on a support member in various ways.

Figure 5:
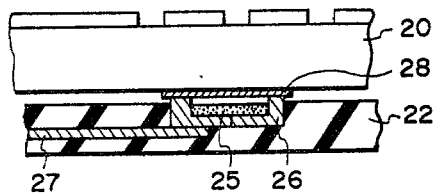
FIGS. 5, 6 and 7 are sections illustrating different examples of means for securing the calculator body on the support member, respectively.

FIG. 5 shows an example in which the calculator body 20 is fixedly placed on the support 22 by means of a magnet 25. More particularly, the magnet 25 is accommodated in a recess of an iron member 26 which is embedded on the surface of the support 22 and electrically connected to the solar battery (not shown) via a lead 27. On the bottom of the calculator body 20 is attached a thin iron plate 28 which is electrically connected to an electrical circuit (not shown) in the body 20.

Figure 6:
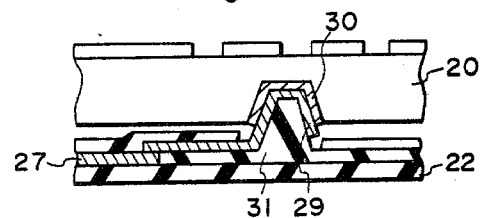
Figure 7:
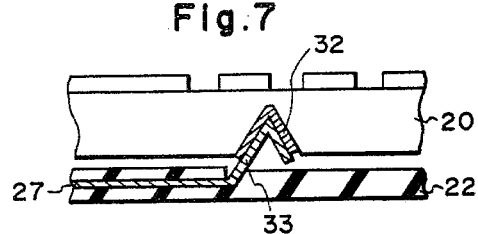

FIGS. 6 and 7 show different examples in which the calculator body 20 is fixedly placed on the support member 22. In both examples, mechanical and electrical connections between the solar battery and the support member 22 are provided by the same means.

In FIG. 6, on an insulating projection 31 is adhered a conductive metal plate 29 which is electrically connected to a lead 27 and forms a plug. The body 20 is provided at its bottom with a socket 30 of conductive metal, in which the plug 29 is snugly fitted to achieve both mechanical and electrical connections.

In FIG. 7, an angled plug 33 of elastic metal is inserted into a socket 32 provided at the bottom of the body 20 to achieve both mechanical and electrical connections between the calculator body and the power source.

As seen from the examples shown in FIGS. 5, 6 and 7, the electrical connection between the solar battery and the calculator body and the mechanical connection between the calculator body and the support member are easily and concurrently accomplished by placing the calculator body on the support and by pressing the body against the support.

The calculator body, the solar battery and the support member can be each formed into a thin structure while maintaining resistance to bending, shock and vibration. The thus obtained calculator is thin and handy as in the case of FIG. 2.

The above-described embodiments, in which the calculator body and the solar battery power source are independent from each other, are directed to a so-called "pocket" or "notebook" type electronic calculator. The calculator in any one of the above embodiments has a compact and thin structure while the solar battery may have substantially the same surface area as the calculator body. This surface area is sufficiently large to obtain the power required to operate the calculator so that the calculator can be used at a comparatively low illumination of about 150 luxes.

However, it is also possible to seat the solar battery in the calculator body to integrate the two together. The calculator of this type can not be made extremely small in size because of the substantial surface area of a solar battery. Since "table-top" electronic calculators for use at offices, schools or the like need not be small sized, the light-receiving surface of a solar battery may be arranged on the same panel as buttons of the calculator.

The most important feature of table-top calculators of this type is the easiness of fabrication since an electrical circuit of the calculator body can be provided on the same substrate as a solar battery. For example, a glass cloth impregnated with polyester is used as a substrate. Well-known printed circuits are provided on a specified portion of the substrate to complete the electrical circuit, and a solar battery is provided on another portion of the substrate by vapor deposition using a mask, thereby obtaining a calculator in which the circuit of the calculator body and the solar battery are integrated on the same substrate.

It will be needless to say that such an integrated structure cannot be achieved by using a single crystal silicon solar battery. Integration of the circuit and the solar battery is one of the characteristic features of the invention.

In order to actually use a solar battery having a photovoltaic layer in the form of an amorphous or polycrystalline photoconductive material film as the power source of a small-sized electronic calculator, special attention must be paid to some points which will be described below.

Since the electric power that a solar battery generates upon receipt of light is in general very low, the power consumption of a calculator should be very low. Accordingly, it is necessary to use low power consumption components including liquid crystal display elements and CMOS integrated circuits to satisfy this requirement. By suitably selecting such low power consumption components, a required power of an calculator may be as low as 60 $\mu W$. Reduced power consumption allows the calculator to normally operate with a selenium solar battery having a light-receiving surface of 3022 mm$^2$ (25.4 mm×8.5 mm×14$^2$) at an illumination of 150 luxes under a fluorescent lamp. That is, the calculator of the present invention fully operates under normal conditions.

The intensity of incident light on a solar battery varies for each light source. For example, sunlight and a household fluorescent lamp differ by several hundred times or more in luminous intensity. Accordingly, the output of a solar battery varies over a wide range. On the other hand, the above-mentioned liquid crystal display elements and CMOS IC have narrow allowable operating voltage ranges of generally 2.4 to 3.5 volts and 2.3 to 4.5 volts, respectively, though a slight deviation is found for each type, of course. With these components employed, the voltage applied across the calculator body must fall within the range of 2.4 to 3.5 volts even when the output voltage of a solar battery changes by several hundred times.

Since a conventional constant-voltage circuit using transistors or other elements or a Zener diode has a comparatively high leakage current, it cannot be combined with the solar battery that produces a low current less than 30 $\mu$A.

Figure 8:
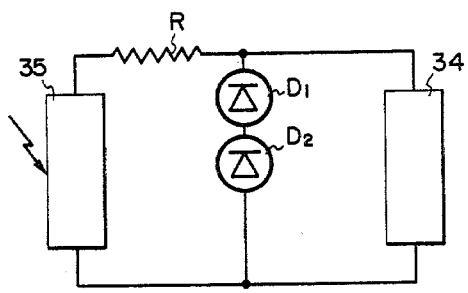
FIG. 8 is a block diagram showing an example of an over-voltage preventing circuit for use in the present invention.

FIG. 8 illustrates an example of a constant-voltage circuit which is free of the above-described shortcomings of the conventional circuits and ensures to avoid the application of voltages more than a rated level to the calculator body. As shown in FIG. 8, a plurality of, for example two, light emitting diodes $D_1$ and $D_2$ and a protective resistance R (which can be omitted) are connected across a solar battery 35. When the output voltage of the solar battery 35 is less than the sum of the rated voltages of diodes $D_1$ and $D_2$, it is applied across a calculator body 34 without any change. If the output voltage exceeds the sum, this excessive energy is released in the form of light emitted from the diodes $D_1$ and $D_2$, thereby preventing the overvoltage from being applied across the calculator body 34. The overvoltage preventing circuit having light emitting diodes may be either seated in the calculator body or separately provided on the support member.

The light incident to a solar battery is sometimes low in intensity. When light of insufficient intensity is incident to a solar battery, which produces an output voltage near a limit of the operating voltage of a calculator, the calculator will operate in an unstable manner and be set to an abnormal program routine so that it cannot be reset, since memories, switches and other elements included in the LSI of the calculator have different operating voltages.

Further, a comparatively long duration of time (several hundred milliseconds) is necessary for the solar battery to produce a maximum voltage after it is exposed to light. No problem occurs when the luminous intensity is high enough. With a low luminous intensity, the LSI and display elements are not actuated at the same instant, causing malfunction.

If the calculator falls in the above undesirable state, it should be reset to the normal state and operated under incident light of sufficient intensity. This is achieved by providing a reset circuit for resetting the calculator quickly and readily.

Figure 9:
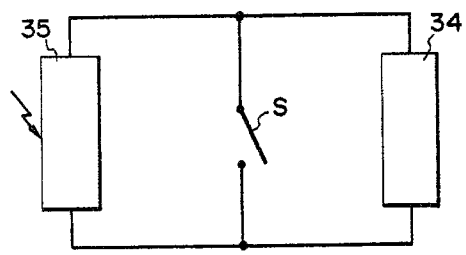
FIG. 9 is a block diagram of a reset circuit for use in the present invention.

FIG. 9 illustrates an example of the reset circuit. A parallel circuit formed by a switch S and the calculator body 34 is connected across the solar battery 35. When the output of the solar battery 35 is reduced below a normal output voltage and the calculator is in the undesirable state, the switch S is closed to short-circuit the solar battery 35. The charges on the display elements, LSI and other elements in the calculator body 34 are completely discharged so that the calculator is restored to the initial state. The switch S is then opened and the output voltage of the solar battery 35 is again applied across the calculator body 34 to make it operable under sufficient incident light.

Among the components of the calculator, the display elements requires a higher voltage (2.4 volts). The user can determine whether or not the calculator is operable by watching the displayed figures.

In practice, the above-mentioned reset circuit may preferably by formed into the calculator body so that the switch can be opened or closed by pushing a button on a calculator panel though it may be provided on the support member independent of the calculator body.

The calculator also serves as an illuminometer. To this end, the LSI may further include a circuit for converting the output voltage of the solar battery into a digital signal representing the level of illumination. Switch means is provided for selectively connecting the output of the calculator body or converter means to the input of the display element. The illumination level is displayed on the display element.

Figure 10:
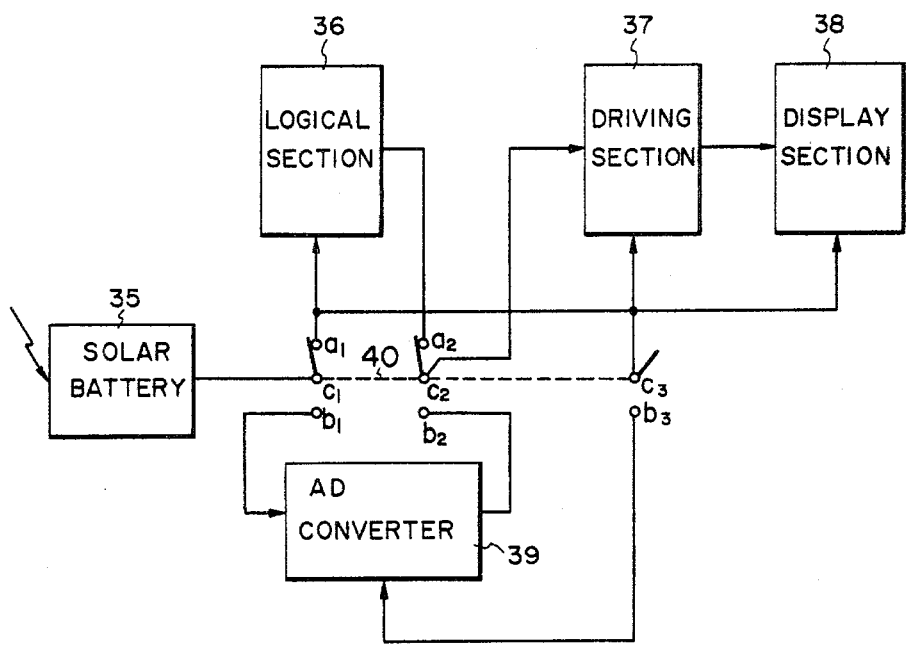
FIG. 10 is a block diagram for illustrating a modification of the electronic calculator of this invention.

With reference to FIG. 10, an example of the electronic calculator which also functions as an illuminometer comprises a solar battery 35, a logical section 36 including a key board, a driving section 37, a display section 38 of liquid crystal, and AD converter 39 and a switch 40. In the calculator mode, contacts $c_1$, $c_2$ of the switch 40 are connected to contact $a_1$, $a_2$, so that the solar battery 35 supplies the power to CMOS-IC of the logical section 36, the driving section 37 and the display section 38 to display the result of logic operations performed by the logical section on the display section 38 through the driving section 37. In the illuminometer mode, contacts $c_1$, $c_2$, $c_3$ of the switch 40 are respectively connected to contacts $b_1$, $b_2$, $b_3$, so that the output current of the solar battery 35 is applied to CMOS-IC of the AD converter 39 and converted to a digital output to indicate it on the display section 38 through the driving section 37.

Figure 11:
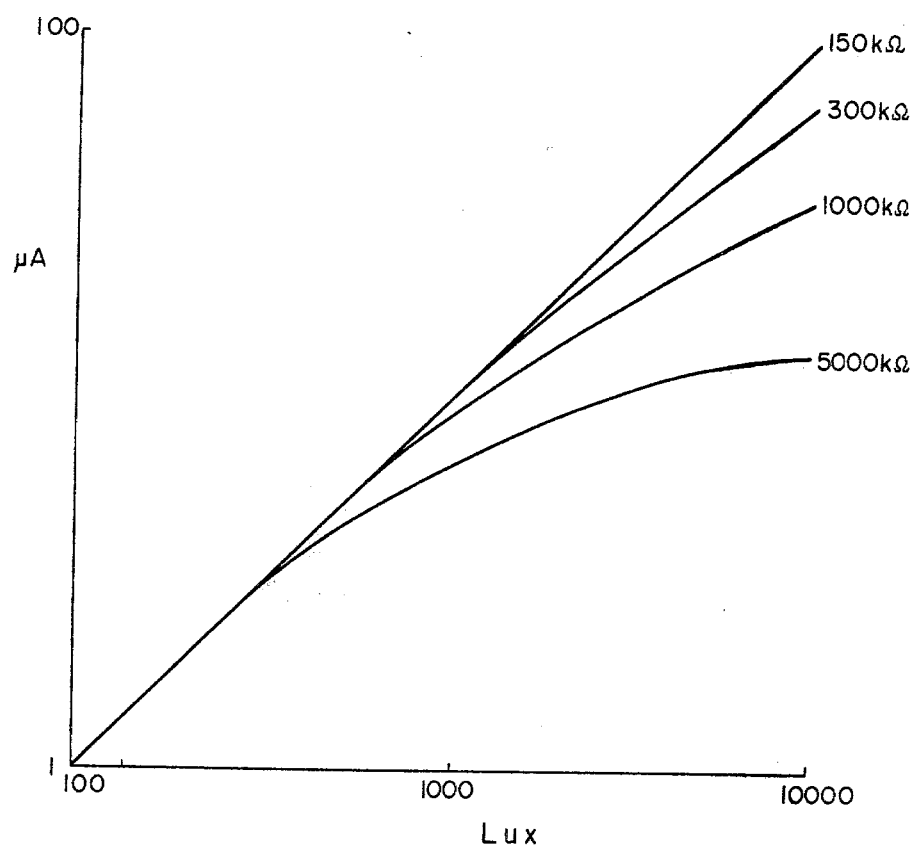
FIG. 11 is a characteristic curve explanatory of the operation of the modification illustrated in FIG. 10.

Since the output current of the solar battery 35 has a linear relation to illumination of the incident light with respect to an appropriate value of the load resistance as shown in FIG. 11, the illumination of the incident light on the solar battery 35 can be correctly displayed by the display section 38.

In the following, a desirable combination of the area of each cell of the selenium solar battery and the number of series-connected cells thereof will be described. In case of an electronic calculator of the business card type, the upper limit of the light receiving area must be less than the size (e.g. 91 mm×55 mm) of a business card, while the lower limit thereof is about half the size of the business card based upon consideration of easy operation of control buttons by the fingers of the calculator user. The suitable current of a selenium solar battery is about 9 micro-amperes/cm$^2$. Moreover, since an electronic calculator of the business card type generally has a required power of 54 to 78 micro-watts and a load current of 18 to 26 micro-amperes, an area of 2.2 to 2.9 cm$^2$ is necessary for the light receiving area of a cell of solar battery. On the other hand, the output voltage is of 2.3 to 2.5 volts for 200 luxes and of 2.7 to 3.1 volts for 400 luxes. In the inventor's test, a size of 80 mm×55 mm is suitable for the electronic calculator of the business card type.

Figure 12:
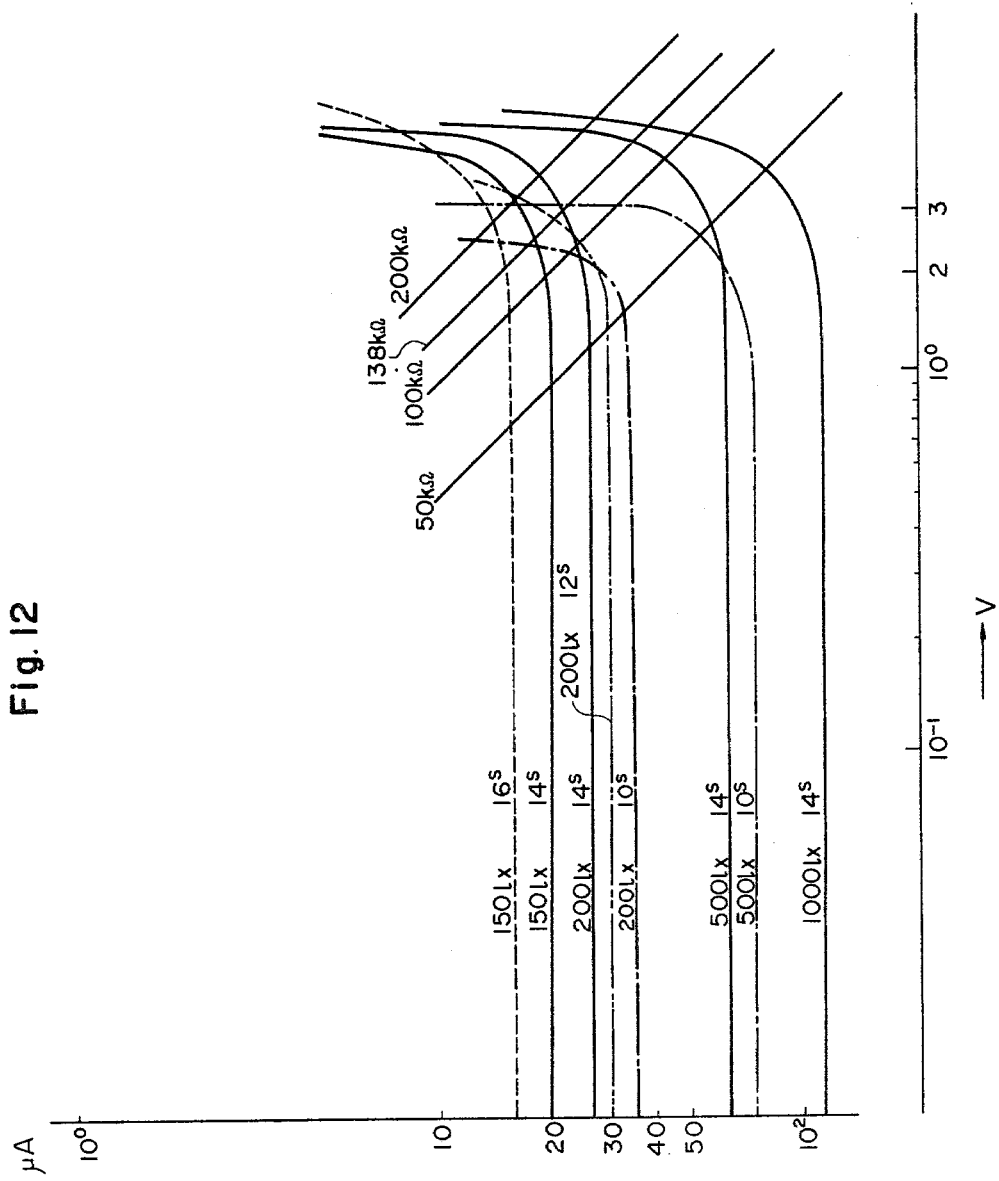
FIGS. 12, 13 and 14 are characteristic curves explanatory of a desirable combination of the area of a cell of the solar battery and the number of series-connected cells thereof in accordance with the present invention.
Figure 13:
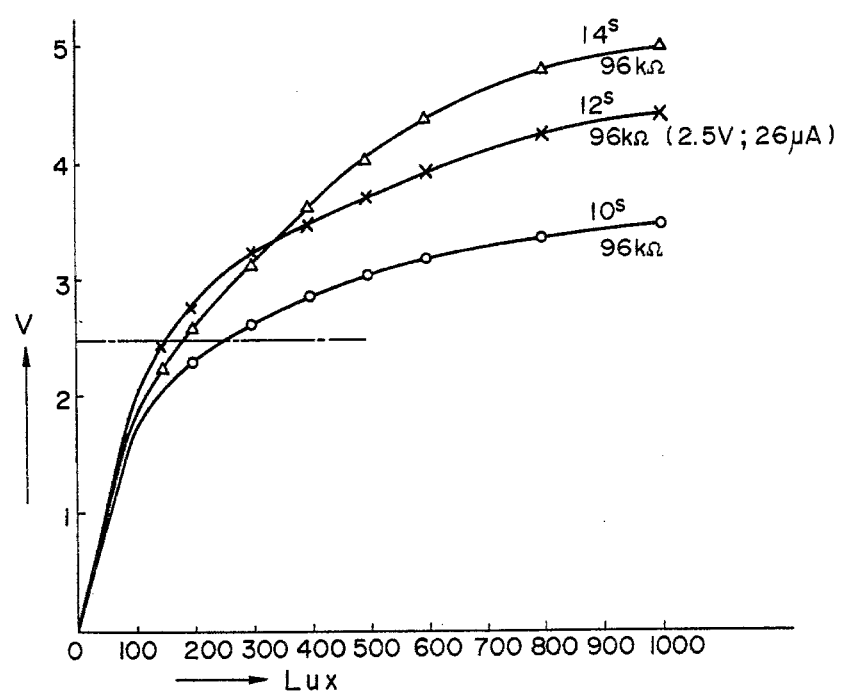
Figure 14:
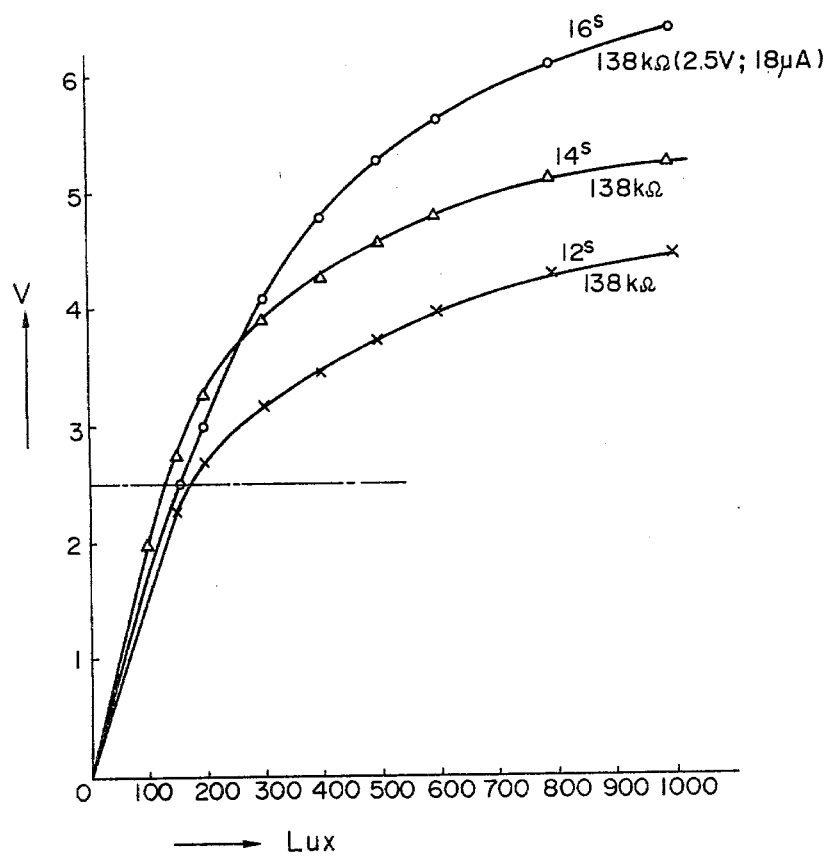

In FIG. 12, the relationship of the output current and the output voltage is shown in the case of available areas of 3.20 cm$^2\times 10^s$, 2.78 cm$^2\times 12^s$, 2.15 cm$^2\times 14^s$ and 1.8 cm$^2\times 16^s$, where "s" is the number of series-connected cells. In FIGS. 13 and 14, the relationships between illumination and the output voltage in the case of load resistances of 96 kΩ and 138 kΩ is shown. As seen from FIG. 13, if the lowest working voltage is equal to 2.5 volts, twelve series-connected cells are suitable for the load current of 26 micro-amperes since the lowest operable luminescent of 150 luxes is obtained. From FIG. 14, in the case of a load current of 18 micro-amperes, fourteen series-connected cells are suitable since the lowest operable luminescent of 140 luxes is obtained.

Since a solar battery having a film of amorphous or polycrystalline photoconductive material, for example, silicon or selenium as its photovoltaic layer is used as a power source, the electronic calculator according to the present invention is small in size, light in weight, resistant to bending and impact, reliable, inexpensive due to avoidance of an expensive single crystal, and free from battery charge or exchange. Since photovoltaic layers having a large surface area can be easily prepared and successively connected in series to one another, the calculator is not only inexpensive, but reliable. Since a comparatively large light-receiving surface can be obtained by separately, arranging the calculator body and the solar battery the calculator can be used even under a comparatively small quantity of light. The calculator of the present invention has the above advantages over the prior art calculators.

For simplicity, the present invention is described by referring to amorphous selenium. Of course, the material which can be used form the photovoltaic layer of a solar battery is not limited to selenium, but other amorphous photoconductive materials such as silicon and gallium arsenide may be used to obtain similar results.

What is claimed is:

1. A small-sized electronic calculator comprising: a calculator body including calculation means comprised of an integrated circuit for performing calculations, and liquid crystal display means for displaying results of calculation operations by said calculation means; and a solar battery electric power source which has a film of polycrystalline selenium as its photovoltaic layer for powering said calculation means and said liquid crystal display means, wherein a combination of the area of each cell of said solar battery and the number of series-connected cells are established to generate a substantially maximum output at a predetermined lowest operable light level.

2. A calculator according to claim 1, wherein said solar battery is formed on an insulting substrate selected from the group consisting of anodized aluminium, and iron coated with an insulator.

3. A calculator according to claim 1, which further comprises an overvoltage preventing circuit including a light emitting diode connected in parallel with said solar battery.

4. A calculator according to claim 1, which further comprises a reset circuit having a switch connected in parallel with the calculator body on the output side of said solar battery.

5. A small-sized electronic calculator comprising: a calculator body including calculation means comprised of an integrated circuit for performing calculations, and liquid crystal display means for displaying results of calculation opertions by said calculation means; a solar battery electric power source which has a film of polycrystalline selenium as its photovoltaic layer for powering said calculation means and said liquid crystal display means; and converter means for converting the output voltage of said solar battery proportional to the level of illumination into a digital signal thereby to provide an illuminometer mode of operation.

6. A calculator according to claim 5, which further comprises switch means for selectively connecting one of the output signals of the calculator body and converter means to the input of the display means, whereby the level of illumination is displayed by the display means when the output of said converter means is connected to the display means.

7. In a miniature electronic calculator, the combination of: calculator means including a calculator integrated circuit for performing calculations, and a liquid crystal display for displaying results of calculations performed by the calculator; a plurality of photoelectric cells each having a polycrystalline selenium photovoltaic film; means for electrically connecting said plurality of photoelectric cells in series and for electrically connecting the series combination of said photoelectric cells to power the calculator means and said liquid crystal display; and wherein the number of said photoelectric cells is selected to substantially minimize the light required to power the calculator.

8. In a miniature electronic calculator according to claim 7, said plurality of photoelectric cells comprising: an electrically insulative substrate; a plurality of conductive lower electrode layers disposed on said electrically insulative substrate; a respective polycrystalline selenium photovoltaic film layer disposed on each of said lower electrode layers; and a respective conductive upper electrode layer disposed on each of said polycrystalline selenium photovoltaic film layers and forming PN junctions between the photovoltaic film layers and the respective upper electrode layers.

9. In a miniature electronic calculator according to claim 8, wherein said lower and upper electrode layers, and said polycrystalline selenium photovoltaic film layers are thin, lightweight and flexible vapor deposited or sputtered layers.

10. In a miniature electronic calculator according to claim 8 or 9, wherein said lower electrode layers are comprised of a material selected from the group consisting of aluminum and bismuth.

11. In a miniature electronic calculator according to claim 8 or 9, wherein said upper electrode layers are comprised of cadmium.

12. In a miniature electronic calculator according to claim 7, 8 or 9, a voltage regulator circuit comprising: a light emitting diode connected in parallel with the series combination of said plurality of photoelectric cells.

13. In a miniature electronic calculator the combination of: a liquid crystal display for displaying results of calculations performed by the calculator; a plurality of photoelectric cells each having a polycrystalline selenium photovoltaic film; means for electrically connecting said plurality of photoelectric cells in series and for electrically connecting the series combination of said photoelectric cells to power the calculator including said liquid crystal display, wherein the number of said photoelectric cells is selected to substantially minimize the light required to power the calculator; and a voltage regulator circuit comprising a light emitting diode connected in parallel with the series combination of said plurality of photoelectric cells, a plurality of light emitting diodes connected in series, a protective resistor connected in series with the series combination of said plurality of photoelectric cells, and said plurality of light emitting diodes connected in parallel with the series combination of said photoelectric cells and said protective resistor.

14. In a miniature electronic calculator, the combination of: a liquid crystal display for displaying results of calculations performed by the calculator; a plurality of photoelectric cells each having a polycrystalline selenium photovoltaic film; means for electrically connecting said plurality of photoelectric cells in series and for electrically connecting the series combination of said photoelectric cells to power the calculator including said liquid crystal display, the number of said photoelectric cells being selected to substantially minimize the light required to power the calculator; an electronic calculator circuit powered by said plurality of photoelectric cells; and resetting means operable for short-circuiting the series combination of said plurality of photoelectric cells when a voltage developed by said photoelectric cells is insufficient to operate said calculator circuit and said calculator circuit is in a malfunctioning condition.

15. A miniature electronic calculator and illuminometer, comprising: an electronic calculator circuit; liquid crystal display means for displaying results of calculations performed by said calculator circuit; voltage generating means comprised of a polycrystalline selenium photoelectric cell for generating a voltage sufficient to operate said electronic calculator circuit and said liquid crystal display in response to light incident thereon; converting means for converting the output voltage of said voltage generating means to a signal for enabling said liquid crystal display means to display a value corresponding to the intensity of the light incident on said polycrystalline selenium photoelectric cell; and switching means for switching the output voltage of said voltage generating means between said calculator circuit and said converting means to change between a calculator mode and an illuminometer mode and for switching between an output of said calculator circuit and the output of said voltage generating means applied to said display means to dislay the results of calculations and light intensity according to the mode selected by said switching means.

16. A miniature electronic calculator and illuminometer according to claim 15, wherein said converting means is effective for converting the output voltage generating means to an output signal according to a linear relationship.

* * * * *